(12) United States Patent
Lee et al.

(10) Patent No.: US 9,349,073 B2
(45) Date of Patent: May 24, 2016

(54) APPARATUS AND METHOD FOR IMAGE MATCHING BETWEEN MULTIVIEW CAMERAS

(71) Applicant: SAMSUNG ELECTRONICS CO., LTD., Suwon-si, Gyeonggi-do (KR)

(72) Inventors: Seung Kyu Lee, Seoul (KR); Hyun Jung Shim, Seoul (KR); Do Kyoon Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 129 days.

(21) Appl. No.: 13/915,069

(22) Filed: Jun. 11, 2013

(65) Prior Publication Data

US 2014/0056508 A1    Feb. 27, 2014

(30) Foreign Application Priority Data

Aug. 27, 2012 (KR) .................. 10-2012-0093438

(51) Int. Cl.
*G06K 9/62* (2006.01)
*G06K 9/00* (2006.01)
*G06T 7/00* (2006.01)

(52) U.S. Cl.
CPC .......... *G06K 9/6201* (2013.01); *G06K 9/00201* (2013.01); *G06T 7/0032* (2013.01); *G06T 7/0065* (2013.01); *G06T 2207/10024* (2013.01); *G06T 2207/10028* (2013.01); *G06T 2207/20076* (2013.01)

(58) Field of Classification Search
CPC ... G06T 19/20; G06T 2200/08; G06T 7/0032; G06T 7/0065; G06T 2207/10024; G06T 2207/10028; G06T 2007/20076; G06K 9/6201; G06K 9/00201
USPC ...................... 382/123, 154; 345/419; 348/42
See application file for complete search history.

(56) References Cited

U.S. PATENT DOCUMENTS

| | | | |
|---|---|---|---|
| 2011/0157373 A1* | 6/2011 | Ye ........................... | G06T 7/002 348/187 |
| 2012/0056982 A1 | 3/2012 | Katz et al. | |
| 2012/0194644 A1* | 8/2012 | Newcombe ............... | G06T 7/20 348/46 |

FOREIGN PATENT DOCUMENTS

| | | |
|---|---|---|
| KR | 10-2006-0063558 | 6/2006 |
| KR | 10-2009-0062440 | 6/2009 |
| KR | 10-2012-0053856 | 5/2012 |

* cited by examiner

*Primary Examiner* — Vu Le
*Assistant Examiner* — Kenny Cese
(74) *Attorney, Agent, or Firm* — NSIP Law

(57) ABSTRACT

An apparatus for image matching between multiview cameras includes a pattern model storing unit to store a pattern model, a matching processing unit to match the stored pattern model with a point cloud obtained by at least one depth camera, and a parameter obtaining unit to obtain a parameter for each of the at least one depth camera, based on a result of the matching.

9 Claims, 11 Drawing Sheets

210

430

510

520

530

APPARATUS AND METHOD FOR IMAGE MATCHING BETWEEN MULTIVIEW CAMERAS

CROSS-REFERENCE TO RELATED APPLICATIONS

This application claims the priority benefit of Korean Patent Application No. 10-2012-0093438, filed on Aug. 27, 2012, in the Korean Intellectual Property Office, the disclosure of which is incorporated herein by reference.

BACKGROUND

1. Field

Example embodiments disclosed herein relate to technology for performing image matching between multiview cameras, by increasing a degree of precision of a camera-model matching scheme, in lieu of an inter-camera matching scheme, using a new chess board and a pattern model, and by increasing the degree of precision through matching of the entire structure of the chess board including a gradient pattern model, in lieu of employing a conventional corner-point matching scheme.

2. Description of the Related Art

A multiview video may correspond to a field of three-dimensional (3D) image processing that may provide a user with multiple views of several directions, through geometric correction, and spatial synthesis of images photographed by at least one camera. Such a multiview video may provide the user with an increased freedom of view.

In computer vision, research is being conducted for verifying depth and disparity information of an object in an image, using an image acquired from multiple views. In computer graphics, image-based rendering is being studied to generate a realistic virtual view image based on acquired multiview images.

Through such research, current multiview image processing technologies may be applied to a monitoring system using an omni-directional camera, a 3D virtual view used in games, view switching for selecting an input image from among images acquired by N cameras, and the like. In addition, the multiview image processing technologies may be applied to a movie or an advertising image, in various manners.

The multiview image processing may have an advantage of providing users with a 3D effect through a wide screen and an increased freedom of view. However, the multiview image processing may require redundant conditions as a prerequisite for acquiring images, an increase in an amount of data to be processed instantly, and expensive equipment, and thus, developments of various services have been limited.

Data transfer technologies and an increase in a data transfer rate through the Internet may act as a great catalyst for enabling usage of various multimedia contents. Furthermore, in recent times, users are demanding conversation-based contents and realistic contents, in addition to simple contents.

As such, multiview images may be excellent measures for satisfying various demands of the users.

SUMMARY

The foregoing and/or other aspects are achieved by providing an apparatus for image matching between multiview cameras, the apparatus including a pattern model storing unit to store a pattern model, a matching processing unit to match the stored pattern model with a point cloud obtained by at least one depth camera, and a parameter obtaining unit to obtain a parameter for each of the at least one depth camera, based on a result of the matching.

The pattern model storing unit may store a pattern model represented by a gradient and a corner.

The pattern model storing unit may store a pattern model including, as an object, at least one gradation circle and the corner classified by a chess board.

The point cloud obtained by the at least one depth camera may include at least one point and an intensity corresponding to a depth value with respect to the at least one point.

The matching processing unit may determine a corner point corresponding to a corner associated with the pattern model, among the at least one point included in the point cloud, and may primarily match the determined corner point with the corner associated with the pattern model.

The matching processing unit may secondarily match the point cloud with the pattern model, using the intensity corresponding to the depth value with respect to the at least one point, and a gradient of the pattern model.

The matching processing unit may secondarily match the point cloud with the pattern model, by moving the point cloud, and determining a position at which a difference between the intensity corresponding to the depth value with respect to the at least one point and the gradient of the pattern model is at a minimum.

The matching processing unit may calculate a point local surface Euclidean distance with respect to the secondarily matched point cloud, and may additionally change a parameter in a direction in which the calculated point local surface Euclidean distance is minimized.

The parameter obtaining unit may obtain a parameter including at least one of translation information and rotation information for each of the at least one depth camera, based on a result of the matching.

The foregoing and/or other aspects are achieved by providing an apparatus for image matching between multiview cameras, the apparatus including a primary matching processing unit to primarily match a corner associated with a pattern model with a predetermined corner point included in a point cloud obtained by at least one depth camera, and a secondary matching processing unit to perform secondary matching, in view of an intensity corresponding to a depth value with respect to the point cloud and a gradient of the pattern model, based on a result of the primary matching.

The apparatus may further include a tertiary matching processing unit to calculate a point local surface Euclidean distance with respect to the secondarily matched point cloud, and to additionally change a parameter in a direction in which the calculated point local surface Euclidean distance is minimized.

The secondary matching processing unit may secondarily match the point cloud with the pattern model, by moving the point cloud, and determining a position at which a difference between an intensity corresponding to a depth value with respect to at least one point included in the point cloud and the gradient of the pattern model is at a minimum.

The foregoing and/or other aspects are achieved by providing a method for image matching between multiview cameras, the method including storing a pattern model, matching the stored pattern model with a point cloud obtained by at least one depth camera, and obtaining a parameter for each of the at least one depth camera, based on a result of the matching.

The storing may include storing a pattern model represented by a gradient and a corner.

The matching may include determining a corner point corresponding to a corner associated with the pattern model, among the at least one point included in the point cloud, and primarily matching the determined corner point with the corner associated with the pattern model.

The matching may include secondarily matching the point cloud with the pattern model, using the intensity corresponding to the depth value with respect to the at least one point, and a gradient of the pattern model.

The secondarily matching may include secondarily matching the point cloud with the pattern model, by moving the point cloud, and determining a position at which a difference between the intensity corresponding to the depth value with respect to the at least one point and the gradient of the pattern model is at a minimum.

The matching may include calculating a point local surface Euclidean distance with respect to the secondarily matched point cloud, and additionally changing a parameter in a direction in which the calculated point local surface Euclidean distance is minimized.

The foregoing and/or other aspects are achieved by providing a method for image matching between multiview cameras, the method including storing a pattern model displayed on a chess board, the pattern model including an object represented by a gradient and a corner on the chess board, matching a corner associated with the pattern model with a corner point included in a point cloud obtained from a depth camera, to obtain a first parameter, matching the point cloud with the pattern model by determining a position at which a difference between an intensity corresponding to a depth value of the corner point included in the point cloud and the gradient of the pattern model is minimized, to obtain a second parameter; and calculating a point local surface Euclidean distance with respect to the point cloud and changing a third parameter to minimize the calculated point local surface Euclidean distance.

The point cloud may include a depth image generated by capturing an image of a pattern model on the chess board using the depth camera.

The matching a corner associated with the pattern model with a corner point may be performed by moving a point in the point cloud to a position of the corner on the chess board. The matching the point cloud with the pattern model may be performed by moving the point cloud so that an expected position of the point in the point cloud corresponds to the position of the corner on the chess board.

The first parameter, second parameter, and third parameter may include at least one of scale information, rotation information, and translation information, and at least one of the first parameter, second parameter, and third parameter may be adjusted in a direction to minimize a difference between a brightness value of a pattern model and a brightness value of an obtained pattern.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
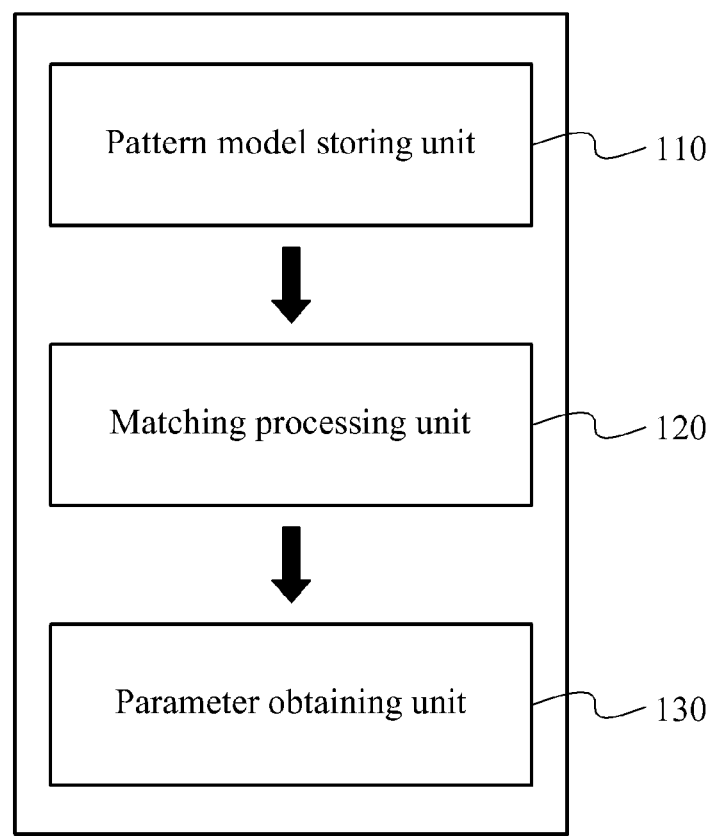
FIG. 1 illustrates an apparatus for image matching between multiview cameras according to example embodiments.

Reference will now be made in detail to embodiments, examples of which are illustrated in the accompanying drawings, wherein like reference numerals refer to like elements throughout. Embodiments are described below to explain the present disclosure by referring to the figures.

When it is determined that a detailed description is related to a related known function or configuration which may make the purpose of the present disclosure unnecessarily ambiguous in the description, such detailed description will be omitted. Also, terminologies used herein are used to appropriately describe the exemplary embodiments and thus may be changed depending on a user, the intent of an operator, or a custom. Accordingly, the terminologies must be viewed based on the following overall description of this specification.

FIG. 1 illustrates an apparatus 100 for image matching between multiview cameras according to example embodiments.

The apparatus 100 may complement an inter-camera matching scheme developed for a conventional color camera, and provide a new chess board capable of matching subpixels at a low resolution.

The apparatus 100 may increase a degree of precision by a camera-model matching scheme, in lieu of an inter-camera matching scheme, using a new chess board and a pattern model.

The apparatus 100 may increase a degree of precision in image matching between multiview cameras, by a scheme of matching the entire structure of a chess board including a pattern of a gradient form, instead of employing a conventional corner-point matching scheme.

In particular, the apparatus 100 may be used for multiview camera matching in a high-resolution environment, however, the apparatus 100 may be used more efficiently for inter-multiview camera matching in a low-resolution environment.

Referring to FIG. 1, in order to implement the foregoing scheme, the apparatus 100 may include a pattern model storing unit 110, a matching processing unit 120, and a parameter obtaining unit 130.

The pattern model storing unit 110 may store a pattern model to be displayed on a chess board, as calibration information. The pattern model may include an object represented by a gradient and a corner on the chess board. The pattern model storing unit 110 may be embodied as a non-transitory computer-readable media including a data storage unit such as a read-only memory (ROM) or electrically erasable programmable read-only memory (EEPROM), magnetic media such as hard disks, floppy disks, and magnetic tape; optical media such as CD ROM disks and DVDs; magneto-optical media such as optical discs; and hardware devices that are specially configured to store and perform program instructions, such as ROM, random access memory (RAM), flash memory (e.g., a USB flash drive), and the like.

For example, the pattern model may include a gradation circle represented by a gradient and a corner on the chess board.

Herein, although the gradient circle is used as the pattern model, the pattern model may be represented in a form of various figures, patterns, and the like.

The matching processing unit 120 may match the stored pattern model with a point cloud obtained by at least one depth camera.

The point cloud may be construed as a set of points defined as X, Y, and Z/R, G, and B generated through three-dimensional (3D) scanning using a depth camera. That is, coordinate values may correspond to the X, Y, and Z information to describe position information of the point cloud and color values may correspond to the R, G, and B, information to describe color information. The point cloud may be construed using a set of points including color spaces or color models having color information other than RGB. For example, CMYK, RGBY, HSV, and the like may be used instead of, or in addition to, RGB values.

In addition, the point cloud obtained by the at least one depth camera may include at least one point, and an intensity corresponding to a depth value with respect to the at least one point.

A spatial configuration of the point cloud may be formed by a great number of colors and data of coordinates. The point cloud may become more specific data as a density of the point cloud increases, and may have a meaning as a single 3D model.

The point cloud may be construed as a depth image generated by photographing a pattern model on the chess board, using a depth camera. A plurality of points included in the point cloud may be represented by a depth value with respect to the pattern model on the chess board.

For example, each of the plurality of points included in the point cloud may represent a depth value with respect to the pattern model on the chess board, using an intensity. In particular, a point having a deep color or a dark brightness due to a high intensity may be construed as a portion having a high depth value in the pattern model. A point having a relatively low brightness may be construed as a portion having a lower depth value in the pattern model.

The matching processing unit 120 may increase a degree of precision by a camera-model matching scheme, rather than an inter-camera matching scheme, using the chess board and the pattern model.

The matching processing unit 120 may verify an intensity for each point obtained along with the point cloud obtained by the at least one depth camera.

The matching processing unit 120 may detect a point portion corresponding to a corner of the chess board in a 3D point cloud, using the intensity for each point.

By matching the point portion corresponding to the corner of the chess board in the point cloud with an actual corner, a parameter including rotation information and translation information for each camera may be obtained. Other parameters such as scaling information may also be obtained.

The point cloud may correspond to a two-dimensional (2D) image photographed by a depth image, and a point portion of the point cloud may not coincide precisely with a corner associated with the pattern model.

However, a probability that the point portion of the point cloud may be present in a position close to the corner associated with the pattern model may be exceedingly high.

The matching processing unit 120 may perform primary matching of which a degree of precision is relatively low, as described above.

For more precise matching, the matching processing unit 120 may additionally obtain and adjust a parameter, in a direction in which a difference between a brightness value of the pattern model and a brightness value of an obtained pattern is minimized.

For example, the matching processing unit 120 may additionally obtain scale information, rotation information, and translation information, or may adjust information obtained in advance.

In particular, the matching processing unit 120 may perform precise secondary matching in view of a gradient of the pattern model and an intensity of the point cloud with respect to the pattern model and the point portion of the point cloud primarily matched.

The matching processing unit 120 may perform additional high-precision matching with respect to the pattern model and the point cloud on which the primary matching and the secondary matching are performed.

For high-precision matching, the matching processing unit 120 may calculate a point local surface Euclidean distance with respect to the point cloud primarily and secondarily matched, and may additionally change a parameter in a direction in which the calculated point local surface Euclidean distance is minimized. For example, a Euclidean distance may refer to a distance between a first point in the point cloud primarily matched and a second point in the point cloud secondarily matched.

For example, the matching processing unit 120 may additionally change a parameter including, for example, scale information, rotation information, translation information, and the like, in the direction in which the calculated point local surface Euclidean distance is minimized.

The parameter obtaining unit 130 may obtain a parameter including at least one of rotation information and translation information for each of the at least one depth camera, based on a result of the matching. Other parameters such as scaling information may also be obtained.

In addition, the parameter obtaining unit 130 may additionally change the parameters, for example, the scale information, the rotation information, the translation information, and the like, through the secondary matching, the additional high-precision matching, and the like.

Figure 2A:
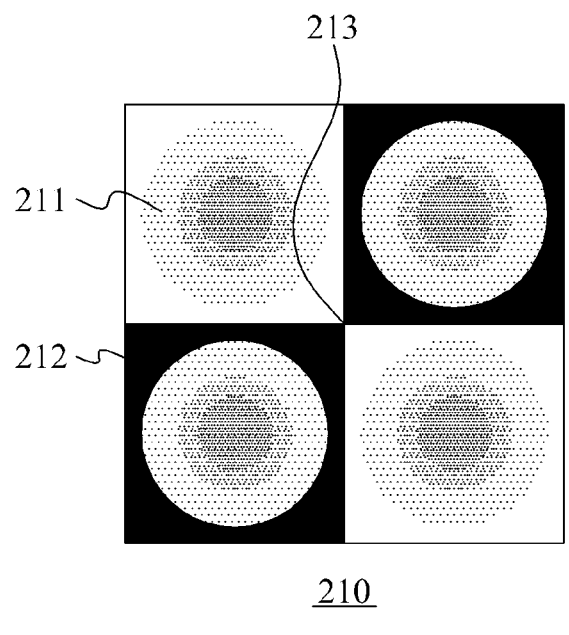
FIGS. 2A and 2B illustrate a pattern model and a point cloud obtained by photographing the pattern model using a depth camera according to example embodiments.
Figure 2B:
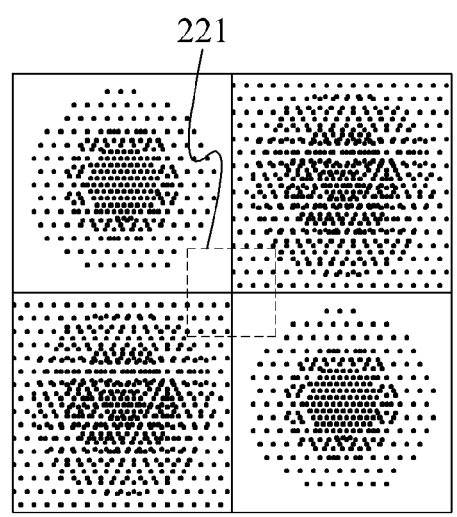

FIGS. 2A and 2B illustrate a pattern model and a point cloud obtained by photographing the pattern model using a depth camera according to example embodiments.

Referring to FIGS. 2A and 2B, calibration information 210 may include at least one pattern model 211 and a chess board 212.

In particular, the calibration information 210 may include the at least one pattern model 211 represented by a gradient, and a corner 213 generated by the chess board 212.

Herein, although the at least one pattern model 211 is described as a gradation circle, various figures or patterns may be used.

The point cloud 220 may be construed as a depth image acquired by photographing the chess board 212 and the pattern model 211 included in the chess board 212 using a depth camera.

The point cloud 220 may represent a depth value measured by the depth camera, and in particular, may represent the depth value using an intensity of a color or brightness of each of a plurality of points.

The corner 213 generated by the chess board 212 may be present in a central area 221 of the point cloud 220.

However, verifying a point in the central area 221 coinciding precisely with the corner 213 through the point cloud 220 photographed by the depth camera may be difficult due to a low resolution.

Accordingly, a process of determining a point closest to a position of the corner 213 in the point cloud 220 during the primary matching, and temporarily moving the determined point to the position of the corner 213 may be required.

Although the closest point is not the corner 213, by temporarily moving the closest point, a movement of the point cloud 220 during the secondary matching may be minimized.

In the secondary matching, instead of the determined point being temporarily moved, the point cloud 220 may be moved so that the position of the corner 213 in the point cloud 220 may correspond to the actual corner 213.

By performing the primary matching and the secondary matching, precise matching between the point cloud 220 and the pattern model may be possible.

Hereinafter, the central area 221 of the point cloud 220 will be described in detail with reference to FIG. 3.

Figure 3:
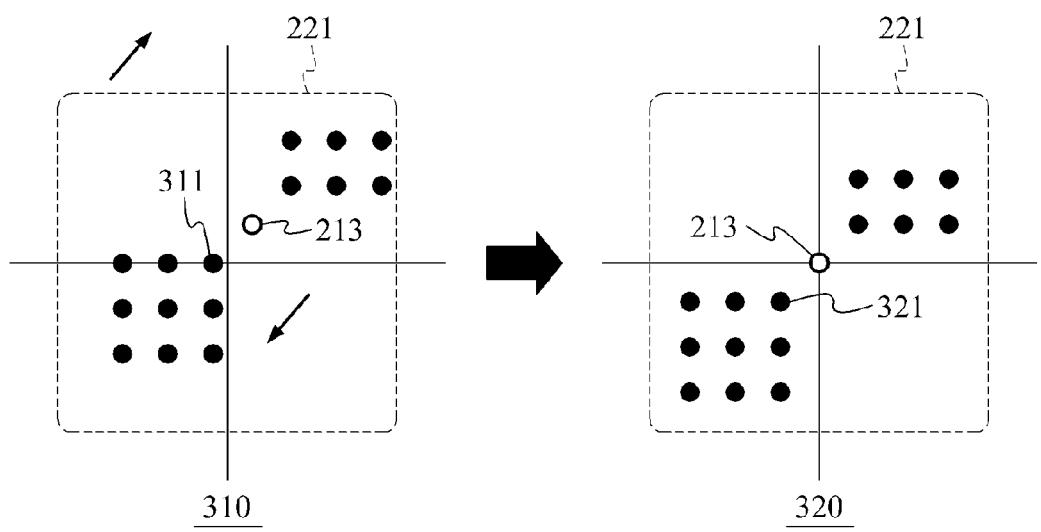
FIG. 3 illustrates a primary matching method, and a secondary matching method which obtains a more precise result than the primary matching, according to example embodiments.

FIG. 3 illustrates primary matching, and secondary matching which achieves a more precise result than the primary matching method, according to example embodiments.

The primary matching will be described with reference to a left view 310.

In the primary matching, a point 311 closest to a position of a corner 213 in a central area 221 of a point cloud may be determined.

In addition, the primary matching may be performed by temporarily moving the point 311 to the position of the corner 213 generated by a chess board.

The secondary matching will be described with reference to a right view 320.

In the secondary matching, instead of a determined point 321 being temporarily moved, the point cloud may be moved so that an expected position of a corner extracted in the point cloud may correspond to the actual corner 213.

In this instance, the expected position of the corner may be verified through a stored pattern model.

As described above, through the primary matching and the secondary matching, precise matching between the point cloud and the pattern model may be possible.

Figure 4A:
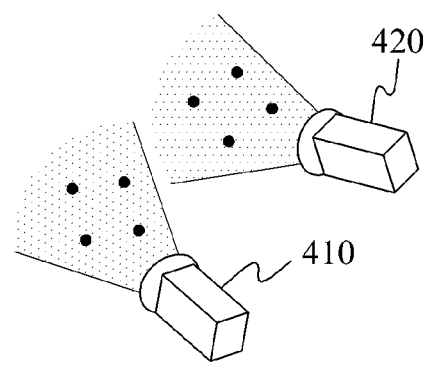
FIGS. 4A and 4B illustrate image matching between multiview cameras according to example embodiments.
Figure 4B:
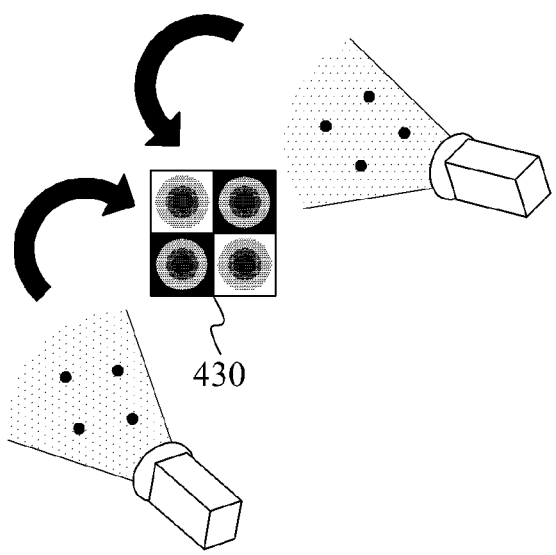

FIGS. 4A and 4B illustrate image matching between multiview cameras according to example embodiments.

Referring to FIGS. 4A and 4B, points in a 3D space may be obtained by depth cameras 410 and 420. In this instance, the depth cameras 410 and 420 may generate a point cloud by obtaining a depth value of each point.

For image matching among multiple depth cameras, a point of another depth camera corresponding to a predetermined 3D point of a depth camera may need to be determined.

Accordingly, an apparatus for image matching between multiview cameras may perform primary matching for moving a point closest to a corner in the point cloud to a position of the corner, using calibration information 430.

In addition, the apparatus may perform secondary matching for more precisely matching the point cloud with a pattern model included in the calibration information 430, using a gradient of the pattern model and an intensity of each of the plurality of points constituting the point cloud.

When performing point-to-point matching between images photographed by depth cameras, a matching scheme may be limited to a scheme of matching a single 3D point directly to one of the 3D points obtained by another camera.

When such a scheme is used, as a resolution of the camera becomes lower, a worse result of the matching may be obtained.

When the apparatus for image matching between the multiview cameras is used, a predetermined point of one camera may be matched with any position between points, for example, a subpixel, as well as a predetermined point of another camera, irrespective of the resolution of the camera.

Figure 5A:
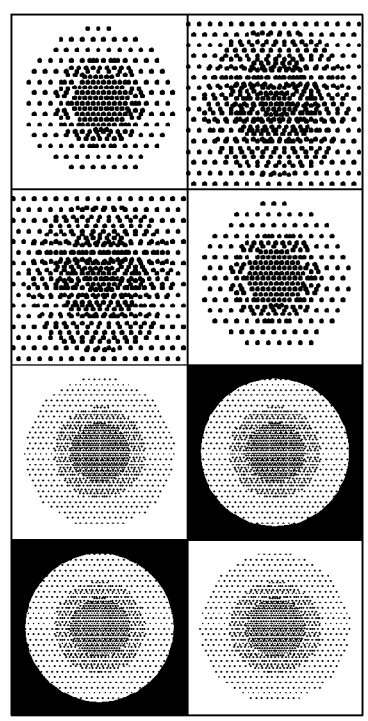
FIGS. 5A through 5C illustrate a process of matching a pattern model with a point cloud according to example embodiments.
Figure 5B:
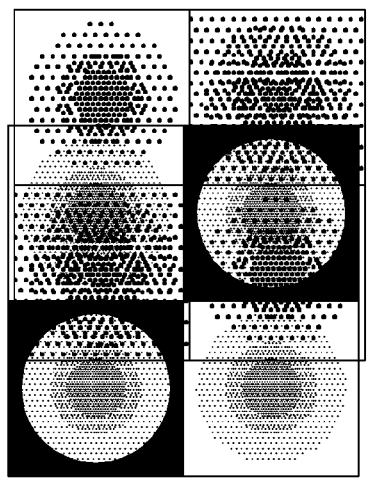
Figure 5C:
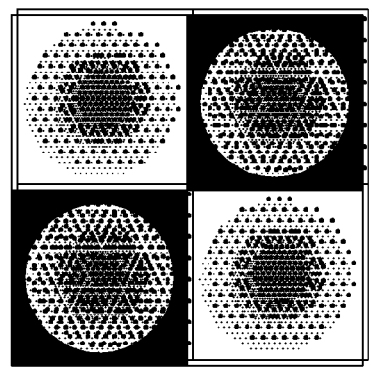

FIGS. 5A through 5C illustrate a process of matching a pattern model with a point cloud according to example embodiments.

The point cloud corresponding to a depth image acquired from calibration information may be overlapped with the pattern model included in the calibration information, in an order of a view 510 of FIG. 5A, a view 520 of FIG. 5B, and a view 530 of FIG. 5C.

An apparatus for image matching between multiview cameras may determine a point closest to a corner of the calibration information, among the plurality of points included in the point cloud, and may perform primary matching, as shown in the view 530.

In particular, the apparatus may determine a corner point corresponding to a corner associated with the pattern model, among the at least one point included in the point cloud, and may primarily match the determined corner point with the corner associated with the pattern model.

The apparatus may perform secondary matching more precisely, in view of an intensity of the point cloud and a gradient with respect to the pattern model of the calibration information.

As an example, the apparatus may secondarily match the point cloud with the pattern model, using a gradient of the pattern model and an intensity corresponding to a depth value with respect to the at least one point.

In this instance, a matching processing unit of the apparatus may secondarily match the point cloud with the pattern model, by moving the point cloud, and determining a position at which a difference between the intensity corresponding to the depth value with respect to the at least one point and the gradient of the pattern model is at a minimum.

The apparatus may obtain a parameter including rotation information and translation information for each camera, based on a result of the primary matching. Other parameters may also be obtained such as scaling information.

For more precise matching, the apparatus may additionally obtain and adjust a parameter including scale information, rotation information, and translation information, in a direction in which a difference between a brightness value of a pattern model obtained as a result of the secondary matching and a brightness value of an obtained pattern is minimized, based on a result of the secondary matching.

The apparatus may calculate a point local surface Euclidean distance with respect to the secondarily matched point cloud, and may additionally change a parameter in a direction in which the calculated point local surface Euclidean distance is minimized. Accordingly, the apparatus may perform high-precision matching.

When the apparatus according to example embodiments is used, an inter-camera image matching scheme developed for a conventional color camera may be complemented, and subpixel matching may be possible at a low resolution.

Figure 6:
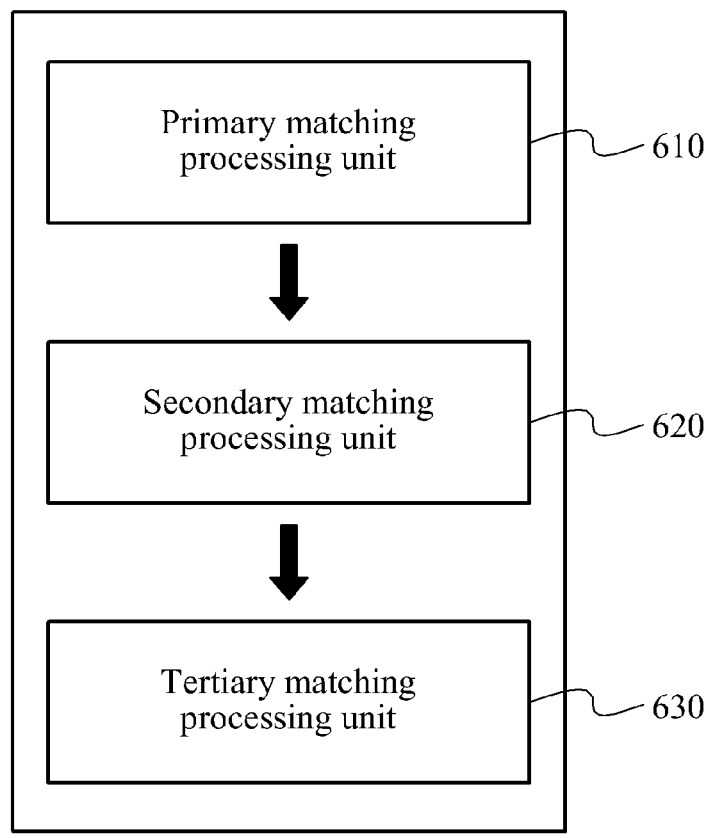
FIG. 6 illustrates an apparatus for image matching between multiview cameras according to example embodiments.

FIG. 6 illustrates an apparatus 600 for image matching between multiview cameras according to example embodiments.

Referring to FIG. 6, the apparatus 600 may include a primary matching processing unit 610, a secondary matching processing unit 620, and a tertiary matching processing unit 630.

For image matching among multiple depth cameras, a point of another depth camera corresponding to a predetermined 3D point of a depth camera may need to be determined.

The apparatus 600 may primarily match a predetermined corner point included in a point cloud obtained by at least one depth camera, with a corner associated with a pattern model, using the primary matching processing unit 610.

In particular, the primary matching processing unit 610 may perform the primary matching for moving a point closest to the corner in the point cloud to a position of the corner, using calibration information.

The point cloud may represent a depth value measured by the depth camera, and in particular, may represent a depth value of the pattern model using an intensity of a color or brightness of each of a plurality of points. For example, generally, the brighter a point appears, or as the intensity increases, the closer a point is to the depth camera.

In addition, the corner generated by a chess board may be present in a central area of the point cloud. Such a corner may be generated by a lattice pattern of the chess board, and may be positioned in the center of the pattern model. Accordingly, the corner may be construed as corresponding to the pattern model.

However, verifying a point in the central area coinciding precisely with the corner through a point cloud photographed by a low-resolution depth camera may be difficult.

Accordingly, the primary matching processing unit 610 may need to perform a process of determining a point closest to the position of the corner in the point cloud, and temporarily moving the determined point to the position of the corner.

In particular, a probability that the point closest to the actual corner in the chess board is not present in a position identical to the position of the actual corner may be relatively high. However, by temporarily moving the closest point to the actual corner, a movement of the point cloud during the secondary matching may be minimized.

The primary matching processing unit 610 may obtain a parameter including rotation information and translation information for each camera, by matching a point portion corresponding to the corner of the chess board in the point cloud with the actual corner of the chess board. Other parameters may be obtained such as scaling information.

The point cloud may correspond to a 2D image photographed by the depth camera. Although the point portion of the point cloud fails to coincide precisely with the corner associated with the pattern model, a probability that the point portion of the point cloud may be present in a position close to the corner associated with the pattern model may be considerably high.

The secondary matching processing unit 620 may perform secondary matching in view of a gradient of the pattern model and an intensity corresponding to a depth value with respect to the point cloud, based on a result of the primary matching.

The secondary matching processing unit 620 may secondarily match the point cloud with the pattern model, by moving the point cloud, and by determining a position at which a difference between an intensity corresponding to a depth value with respect to the at least one point included in the point cloud and a gradient of the pattern model is at a minimum.

The secondary matching processing unit 620 may perform secondary matching more precisely, in view of an intensity of the point cloud and a gradient with respect to the pattern model of the calibration information.

In particular, the secondary matching processing unit 620 may secondarily match the point cloud with the pattern model, using an intensity corresponding to a depth value with respect to the at least one point and a gradient of the pattern model.

In this instance, the secondary matching processing unit 620 may secondarily match the point cloud with the pattern model, by moving the point cloud, and determining a position at which a difference between the intensity corresponding to the depth value with respect to the at least one point and the gradient of the pattern model is at a minimum.

For more precise matching, the secondary matching processing unit 620 may additionally obtain and adjust a parameter in a direction in which a difference between a brightness value of the pattern model and a brightness value of an obtained pattern is minimized.

When performing point-to-point matching between images photographed by depth cameras, a matching scheme may be limited to a scheme of matching a single 3D point directly to one of 3D points obtained by another camera.

When such a scheme is used, as a resolution of the camera becomes lower, a worse result of the matching may be obtained.

When the secondary matching processing unit 620 is used, a predetermined point of one camera may be matched with any position between points, for example, a subpixel, as well as a predetermined point of another camera, irrespective of the resolution of the camera.

The secondary matching processing unit 620 may additionally obtain scale information, rotation information, and translation information through the secondary matching, or may adjust information obtained in advance.

The tertiary matching processing unit 630 may calculate a point local surface Euclidean distance with respect to the secondarily matched point cloud, and may additionally change a parameter in a direction in which the calculated point local surface Euclidean distance is minimized.

The tertiary matching processing unit 630 may perform additional high-precision matching with respect to the point cloud and the pattern model on which the primary matching and the secondary matching are performed.

In particular, for more precise matching, the tertiary matching processing unit 630 may additionally obtain and adjust a parameter including scale information, rotation information, and translation information, in a direction in which a difference between a brightness value of a pattern model obtained as a result of the secondary matching and a brightness value of an obtained pattern is minimized, based on a result of the secondary matching.

The tertiary matching processing unit 630 may calculate a point local surface Euclidean distance with respect to the primarily and secondarily matched point cloud, and may additionally change a parameter in a direction in which the calculated point local surface Euclidean distance is minimized.

For example, the tertiary matching processing unit 630 may additionally change a parameter including, for example, scale information, rotation information, and translation information, in a direction in which the calculated point local surface Euclidean distance is minimized.

The tertiary matching processing unit 630 may obtain a parameter including at least one of rotation information and translation information for each of the at least one depth camera, based on a result of the matching. Other parameters may be obtained such as scaling information.

The tertiary matching processing unit 630 may additionally change a parameter including, for example, the scale information, the rotation information, the translation information, and the like, through the secondary matching, the additional high-precision matching, and the like.

Figure 7:
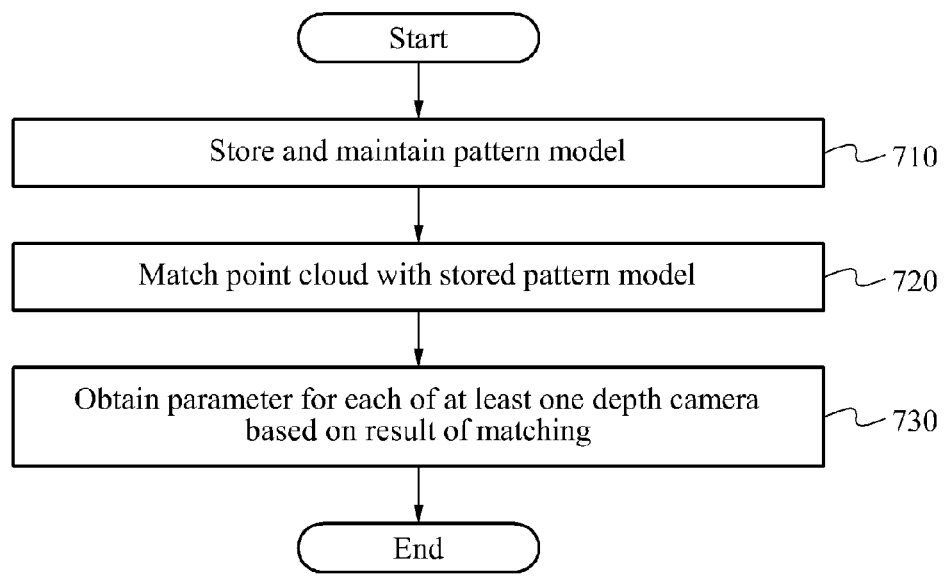
FIG. 7 illustrates a method for image matching between multiview cameras according to example embodiments.

FIG. 7 illustrates a method for image matching between multiview cameras according to example embodiments.

Referring to FIG. 7, in operation 710, a pattern model may be stored and maintained. The pattern model may be stored in a non-transitory computer-readable media including a data storage unit such as a read-only memory (ROM) or electrically erasable programmable read-only memory (EEPROM), magnetic media such as hard disks, floppy disks, and magnetic tape; optical media such as CD ROM disks and DVDs; magneto-optical media such as optical discs; and hardware devices that are specially configured to store and perform program instructions, such as ROM, random access memory (RAM), flash memory (e.g., a USB flash drive), and the like.

In particular, a pattern model represented by a gradient and a corner may be stored.

In operation 720, the stored pattern model may be matched with a point cloud obtained by at least one depth camera.

In this instance, primary matching, secondary matching, and tertiary matching may be performed with respect to the obtained point cloud and the stored pattern model.

In particular, a corner point corresponding to a corner associated with the pattern model may be determined among at least one point included in the point cloud, and the determined corner point may be primarily matched with the corner associated with the pattern model.

The point cloud may be secondarily matched with the pattern model, using a gradient of the pattern model and an intensity corresponding to a depth value with respect to the at least one point.

In particular, the point cloud may be secondarily matched with the pattern model, by moving the point cloud, and determining a position at which a difference between the intensity corresponding to the depth value with respect to the at least one point and the gradient of the pattern model is at a minimum.

The point cloud may be tertiarily matched with the pattern model, by calculating a point local surface Euclidean distance with respect to the secondarily matched point cloud, and additionally changing a parameter in a direction in which the calculated point local surface Euclidean distance is minimized.

In operation 730, a parameter for each of the at least one depth camera may be obtained based on results of the primary matching, the secondary matching, and the tertiary matching. By performing the primary matching, secondary matching, and/or tertiary matching, image matching between multiview cameras may be accurately and precisely performed. Additionally, secondary matching may be performed using results obtained from primary matching, and tertiary matching may be performed using results obtained from the secondary matching and primary matching, to obtain even more accurate and precise image matching results. Parameters obtained through the primary, second, and tertiary matching, for example, scale information, rotation information, and translation information, may be adjusted to improve image matching results. For example, parameters may be adjusted in a direction to minimize a difference between a brightness value of a pattern model obtained as a result of previous matching and a brightness value of an obtained pattern.

In the above-described example embodiments, some or all of the components constituting the apparatus for image matching between multiview cameras may be realized by a kind of module. The module may include software components or hardware components, such as a field programmable gate array (FPGA) or an application specific integrated circuit (ASIC), to perform a specific function. However, the module is not limited to software or hardware. The module may be configured to be present in an addressable storage medium or to execute one or more processors.

The apparatus and methods used to perform image matching between multiview cameras according to the above-described example embodiments may use one or more processors, which may include a microprocessor, central processing unit (CPU), digital signal processor (DSP), or application-specific integrated circuit (ASIC), as well as portions or combinations of these and other processing devices.

The terms "module", and "unit," as used herein, may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Each block of the flowchart illustrations may represent a unit, module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Some or all of the operations performed in the above-described example embodiments may be performed over a wired or wireless network. In addition, for example, a processing element may include a processor or a computer processor. The processing element may be distributed and/or included in a device.

Although example embodiments have been shown and described, it would be appreciated by those skilled in the art that changes may be made to these embodiments without departing from the principles and spirit of the disclosure, the scope of which is defined by the claims and their equivalents.

What is claimed is:

1. An apparatus for image matching between multiview cameras, the apparatus comprising:
   a matching processing unit to match a corner associated with a pattern model with a corner point included in a point cloud obtained from a depth camera, to obtain a first parameter, and to match the point cloud with the pattern model by determining a position at which a difference between an intensity corresponding to a depth value of the corner point included in the point cloud and a gradient of the pattern model is minimized, to obtain a second parameter; and
   a parameter obtaining unit to obtain the first parameter and the second parameter for the depth camera, based on a result of the matching, and
   wherein the pattern model displayed on a chess board includes an object represented by the gradient and the corner of the chess board.

2. The apparatus of claim 1, wherein the point cloud obtained by the at least one depth camera comprises at least one point and an intensity corresponding to a depth value with respect to the at least one point.

3. The apparatus of claim 1, wherein the matching processing unit calculates a point local surface Euclidean distance with respect to the secondarily matched point cloud, and additionally changes a third parameter in a direction in which the calculated point local surface Euclidean distance is minimized.

4. The apparatus of claim 1, wherein the parameter obtaining unit obtains a parameter comprising at least one of translation information and rotation information for each of the at least one depth camera, based on a result of the matching.

5. A method for image matching between multiview cameras, the method comprising:
   matching a corner associated with a pattern model with a corner point included in a point cloud obtained from a depth camera, to obtain a first parameter;
   matching the point cloud with the pattern model by determining a position at which a difference between an intensity corresponding to a depth value of the corner point included in the point cloud and a gradient of the pattern model is minimized, to obtain a second parameter;
   obtaining the first parameter and the second parameter for the depth camera, based on a result of the matching.

6. The method of claim 5, wherein the matching comprises:
   calculating a point local surface Euclidean distance with respect to the secondarily matched point cloud; and
   changing a third parameter in a direction in which the calculated point local surface Euclidean distance is minimized.

7. A non-transitory computer-readable medium comprising a program for instructing a computer to perform the method of claim 5.

8. A method for image matching between multiview cameras, the method comprising:
   storing a pattern model displayed on a chess board, the pattern model including an object represented by a gradient and a corner on the chess board;
   matching a corner associated with the pattern model with a corner point included in a point cloud obtained from a depth camera, to obtain a first parameter;
   matching the point cloud with the pattern model by determining a position at which a difference between an intensity corresponding to a depth value of the corner point included in the point cloud and the gradient of the pattern model is minimized, to obtain a second parameter; and
   calculating a point local surface Euclidean distance with respect to the point cloud and changing a third parameter to minimize the calculated point local surface Euclidean distance.

9. The method of claim 8, wherein the point cloud includes a depth image generated by capturing an image of a pattern model on the chess board using the depth camera,
   wherein the matching a corner associated with the pattern model with a corner point is performed by moving a point in the point cloud to a position of the corner on the chess board,
   wherein the matching the point cloud with the pattern model is performed by moving the point cloud so that an expected position of the point in the point cloud corresponds to the position of the corner on the chess board,
   wherein the first parameter, second parameter, and third parameter include at least one of scale information, rotation information, and translation information, and
   at least one of the first parameter, second parameter, and third parameter is adjusted in a direction to minimize a difference between a brightness value of a pattern model and a brightness value of an obtained pattern.

* * * * *